3,453,068
RECOVERY OF MOLYBDENUM FROM ORGANIC
SOLUTIONS
Richard G. Tave, Philadelphia, Pa., assignor to Atlantic
Richfield Company, Philadelphia, Pa., a corporation of
Pennsylvania
No Drawing. Filed June 22, 1967, Ser. No. 647,942
Int. Cl. C01g *39/00;* C22b *49/00*
U.S. Cl. 23—20                                8 Claims

ABSTRACT OF THE DISCLOSURE

Method for the recovery of molybdenum from organic solutions of compounds thereof by heating the organic solution in a free oxygen containing gas to a temperature in the range of from 850° F. to 2000° F. to convert the molybdenum to the oxide, cooling and collecting the solid oxide at a temperature below the sublimation temperature of the oxide.

BACKGROUND OF THE INVENTION

Field of the invention.—The present invention relates to a method for recovering molybdenum from process streams containing molybdenum compounds dissolved in organic material, particularly from epoxidation reaction product residues by igniting the organic material in air thereby converting the molybdenum to molybdenum oxide and recovering the molybdenum oxide.

The prior art.—No prior art is known which relates to the instant method of recovering molybdenum from organic solutions. The present method is particularly useful, however, for recovering molybdenum used as a catalyst in the epoxidation of olefinically unsaturated compounds to oxirane compounds wth an organic hydroperoxide as the oxidizing agent. Such epoxidation processes are described in detail in Belgian Patent No. 674,076 dated June 20, 1966.

This method is most useful in the propylene epoxidation process described in the application of Harold A. Sorgenti filed of even date herewith and entitled "Molybdenum-Containing Catalyst Solutions and Method of Making and Using Same." In this application it is disclosed that a molybdenum-containing catalyst solution can be made by incorporating metallic molybdenum in a distillate bottoms fraction of a propylene epoxidation reaction product and thereafter heating the mixture to solubilize the molybdenum and produce the catalyst solution. This solution can be recycled to the process. Since only a portion of the bottoms fraction is needed to produce catalyst for recycle, it is necessary for economic reasons to recover the used molybdenum catalyst from the purge bottoms stream.

SUMMARY OF THE INVENTION

In accordance with the present invention molybdenum is recovered as molybdenum oxide by igniting with a gas containing free oxygen the organic portion of an organic solution of molybdenum compounds thereby converting the molybdenum to molybdenum oxide and the organic material to carbon oxides and water, recovering the crude molybdenum oxide, post-treating or burning off the molybdenum oxide to remove any residual carbon and recovering the purified molybdenum oxide. In particular the invention relates to recovering molybdenum from the distillate bottoms fraction of the reaction product of a molybdenum catalyzed epoxidation process.

It is an object of this invention therefore to provide a method for the recovery of molybdenum from organic solutions of molybdenum compounds.

It is another object of this invention to provide a method for the recovery of molybdenum as molybdenum oxide from the reaction product obtained in the epoxidation of olefinic compounds utilizing organic soluble molybdenum compounds as the catalyst.

It is a specific object of this invention to recover molybdenum as molybdenum oxide from the reaction product of a propylene epoxidation process utilizing organic soluble molybdenum compounds as the catalyst.

Other objects of this invention will be apparent from the description of the preferred embodiments and from the claims.

DESCRIPTION OF THE PREFERRED EMBODIMENTS

The method of this invention is generally applicable to the recovery of molybdenum from organic solutions of molybdenum compounds, but in a preferred embodiment of this invention the molybdenum is recovered from an epoxidation reaction product. In the preferred embodiment an olefinically unsaturated compound is epoxidized utilizing a soluble molybdenum catalyst with an organic hydroperoxide as the oxidizing agent. There is produced by this reaction an oxirane compound. The reaction product is distilled to remove the unreacted olefinically unsaturated compound, the oxirane product and most of the alcohol resulting from the reduction of the organic hydroperoxide. The residue or bottoms fraction remaining after the distillation contains unreacted organic hydroperoxide, a small amount of the alcohol resulting from the reduced hydroperoxide, high molecular weight polymeric compounds including high molecular weight polyhydric compounds, i.e., compounds of 200 to 300 in molecular weight, acidic compounds and used molybdenum catalyst.

This molybenum-containing fraction is heated in a gas containing free oxygen to a temperature in the range of from 850° F. to 2000° F. The gas containing free oxygen is generally air which, for convenience will be referred to hereafter but it should be recognized that oxygen enriched air, oxygen depleted air, or other free oxygen-containing gases can be used. In an open system a preferred range is 850° F. to 1700° F. with the most preferred range being from 850° F. to 1050° F. In a closed system the entire range (up to 2000° F.) is quite suitable. In either the open or closed system at these temperatures the organic material is substantially all converted to carbon oxides and water with the molybdenum being converted to the oxide, generally almost entirely to the trioxide. A small amount of carbon sometimes deposits on the molybdenum oxide. If there are organic compounds present which contain sulfur or nitrogen, there will be produced the corresponding sulfur or nitrogen oxides in addition to carbon oxides and water.

Although the ratio of air to molybdenum and organic material charged is not critical it is obvious that a stoichiometric excess should be employed in order to oxidize completely the organic material and convert the molybdenum to the trioxide.

In a closed system the molybdenum oxide produced will not be lost due to vaporization since it is possible to recover the molybednum oxide from the vapor phase. In an open system because of the sublimation of the molybdenum oxide which is appreciable at 1300° F. and becomes extremely pronounced at 1700° F. it is preferred to keep the ignition temperature below about 1050° F. to prevent loss of the molybdenum oxide.

The molybdenum oxide in the form of a crude solid with small amounts of carbon is collected by conventional means such as towers fitted with plates or filled with ceramic shapes or by bag filters or cyclone separators or combinations of these means. If it is desired to obtain a highly purified molybdenum oxide the crude solids after collection are again heated in air to a temperature in the range of from 850° F. to 1500° F. with the preferred range being from 850° F. to 1050° F. to remove residual carbon. It is preferred to carry out the carbon removal operation by heating in an open system with the solids being contained in trays or similar means.

The process of this invention can be carried out in conventional furnaces and utilizing conventionl separating means as has been described. As an example, German Patent No. 1,222,027 dated August 4, 1966, shows the production of molybdenum trioxide by air burning molybdenum disulfide utilizing a furnace and collection means which, by merely modifying the intake can be utilized for the instant process. In the instant process the feed to the furnace is the organic solution of molybdenum compounds rather than the molybdenum disulfide. The type of equipment utilized is not critical and does not form a part of this invention since such equipment is known Certain conditions have been found, however, to be rather critical with respect to yield and purity of the oxide. It has been found that either in the ignition step or in the burn-off step, higher temperatures with long contact time at these elevated temperatures causes yield loss in an open system due to sublimation and can also cause fusion of the solid oxide to the apparatus in either an open or closed system. Moreover, long contact times at elevated temperatures can, for reasons at present not understood, cause lower purity of the oxide. It also has been found that recovery must be carried out at temperatures below the sublimation temperature of the oxide and preferably below about 850° F. In an open system longer times are generally required since the liquid is not flashed and burned with the same rapidity as in a closed system. Moreover, in an open system the ignition step is generally batch so the time will also be a function of the amount. In the burn-off step since it is carried out in an open system in batches, times ranging from a few minutes to several hours, for example, up to 12 hours may be required to give complete carbon removal. In a closed system the time of the ignition step can be extremely short since the preheated charge and air is injected into a furnace wherein the liquid is flashed and burned in a matter of a few seconds. Thus the total residence time in the furnace may be measured in seconds or at most only a few minutes such as 5 minutes or less.

The following examples are provided to illustrate specific embodiments of the invention and to illustrate the temperature and time effects. It will be understood, however, that these examples are not to be construed as limiting the invention solely thereto.

Example I

In order to demonstrate the recovery of molybdenum from organic solutions a molybenum-containing solution was prepared by heating at reflux temperatures a mixture of 0.8 parts by weight of molybdenum powder, 85 parts by weight tertiary butyl alcohol, 10 parts by weight of tertiary butyl hydroperoxide and 5 parts by weight of propylene glycol. After refluxing for about 1 hour the mixture was filtered and diluted with tertiary butyl alcohol containing small amounts of formic acid, propylene glycol and higher molecular weight glycols.

The procedure consisted of evaporating the dilute solution in an air circulating oven at 250° F. to give a solid residue. The residue was ignited over a gas burner until dry, i.e. about 15 minutes. Thereafter the solid residue remaining was weighed and analyzed for its molybdenum content. The amounts charged and products obtained for two runs are shown in Table I.

TABLE I

| Run No. | 1 | 2 |
|---|---|---|
| Liquid charged grams | 183 | 200 |
| Molybdenum content, grams | .51 | .55 |
| Evaporated to residue, grams (at 250° F. in air circulating oven) | 1.39 | 1.50 |
| Ignition temperature, ° F | 950 | ² 1,600–1,709 |
| Solid residue, grams | .77 | .801 |
| Molybdenum content, wt. percent ¹ | 65.7 | 64.1 |
| Percent recovery of molybdenum | 99.6 | 93.6 |

¹ Pure molybdic trioxide contains 66.7 weight percent molybdenum.
² Flame temp.

Example II

A molybdenum-containing bottoms fraction was obtained from a propylene epoxidation process. In this process the propylene was epoxidized to propylene oxide by the use of tertiary butyl hydroperoxide as the oxidizing agent in the presence of a molybdenum catalyst solution produced as in Example I (before dilution). The reaction product was distilled to remove unreacted propylene, propylene oxide product, and most of the tertiary butyl alcohol produced by the reduction of the tertiary butyl hydroperoxide. The residue or bottoms fraction contained the used molybdenum catalyst in a solution of unreacted tertiary butyl hydroperoxide, approximately 12 weight percent; tertiary butyl alcohol, approximately 25 weight percent and acidic compounds, approximately 6 weight percent; approximately 54 weight percent polymeric compounds and high molecular weight polyhydric compounds having 200 to 300 molecular weight and small amounts of other by-products of the reaction. This bottoms fraction was treated as in Example I and the results are shown in Table II.

TABLE II

| Run No. | 3 |
|---|---|
| Liquid charged, grams | 200 |
| Molybdenum content, grams | 0.27 |
| Ignition temperature, ° F. | 950 |
| Solid residue, grams | .43 |
| Molybdenum content, wt. percent | 63.2 |
| Percent recovery of molybdenum | 100 |

The results shown in Examples I and II demonstrate that molybdenum dissolved in various organic solvents can be recovered in a highly pure form but that high ignition temperatures lower both yield and purity.

Example III

In order to demonstrate that burn-off temperature and contact time also influence yield and purity a charge like that of Example II was ignited (without preliminary evaporation) over a burner as described in Example I. The solid residue contained in a porcelain boat was then treated in an air circulating oven to burn off carbon for the times and temperatures shown in Table III.

TABLE III

| Run No. | 4 | 5 | 6 |
|---|---|---|---|
| Amount charge, gms | 600 | 200 | 800 |
| Molybdenum content, gms | .59 | .197 | .788 |
| Ignition temperature (flame temp., ° F.) | 1,600–1,700 | 1,600–1,700 | 1,600–1,700 |
| Carbon burn-off temp., ° F. | ¹ 1,100 | ² 1,500 | ³ 950–1,000 | 950 |
| Time of burn-off, hours | 1N | 4 | 11.5 |
| Mo content, weight percent | 58.0 | 40.3 | 63.1 |
| Percent recovery of Mo | 88.5 | 65.0 | 89.5 |

¹ Burned off one hour at 1,100° F., then ½ hour at 1,500° F.
² Oxide fused to porcelain boat at this temperature.
³ Residue seemed to melt at 1,000–1,020° F.

These data demonstrate that high temperatures and long contact times at high temperatures lower both yield and purity of the oxide product. The solid obtained in Run No. 6 was analyzed by X-ray diffraction and was found to be $MoO_3$ together with a slight amount of $Mo_5O_8(OH)_8$.

The results of these runs show that the final recovery must be sufficiently below the temperatures where the oxide has appreciable vapor pressure and below the fusion temperature of the impure oxide. Thus, commercially, the superheated (300° F.–900° F.) liquid feed is introduced into a furnace where it is flashed in the presence of preheated air at temperatures preferably between 850° F. and 1500° F. to 1700° F. with conventional heat recovery equipment preceding conventional solids recovery equipment, i.e. filters or cyclone separators. The recovered solids are treated in a forced air oven operating at about 950° F. to remove carbon with treating times ranging from 0 to 12 hours. i.e. in some instances the amount of carbon remaining after ignition is too small to require the treating step in the oven, however, if carbon is present a minimum of about 1 hour is required.

I claim:

1. The method for recovering molybdenum from organic solutions thereof which comprises heating the molybdenum-containing organic solution in a free-oxygen containing gas to a temperature in the range of from 850° F. to 2000° F. to convert the molybdenum to the oxide cooling and collecting the solid molybdenum oxide at a temperature below the sublimation temperature of said oxide to recover said oxide.

2. The method according to claim 1 wherein the recovered molybdenum oxide having carbon deposited thereon is heated in additional free oxygen-containing gas at a temperature in the range of from about 850° F. to 1500° F. for from 1 to 12 hours to remove the residual carbon.

3. The method according to claim 1 wherein the molybdenum-containing organic solution is superheated to a temperature in the range of from 300° F. to 900° F. and is thereafter contacted with air at temperatures in the range of from 850° F. to 2000° F.

4. The method according to claim 3 wherein the recovered molybdenum oxide having carbon deposited thereon is heated in the presence of additional free oxygen-containing gas at temperatures in the range of from 850° F. to 1500° F. for from 1 to 12 hours to remove the residual carbon.

5. The method according to claim 2 wherein the heating with additional free oxygen-containing gas is carried out at 950° F.

6. The method according to claim 4 wherein the heating with additional free oxygen-containing gas is carried out at 950° F.

7. The method according to claim 1 wherein the molybdenum-containing organic solution is obtained from the bottoms fraction of the reaction product or an organic soluble molybdenum compound catalyzed olefin epoxidation process.

8. The method according to claim 1 wherein the molybdenum-containing organic solution is obtained from the bottoms fraction of the reaction product of an organic soluble molybdenum compound catalyzed propylene epoxidation process.

References Cited

UNITED STATES PATENTS

| 1,772,960 | 8/1930 | Oberle. | |
| 1,815,132 | 7/1931 | Schwarzkopf. | |
| 1,948,407 | 2/1934 | Watts | 23—140 |
| 2,920,936 | 1/1960 | Dille et al. | 23—50 |

HERBERT T. CARTER, *Primary Examiner.*

U.S. Cl. X.R.

23—22, 140

PO-1050
(5/69)

UNITED STATES PATENT OFFICE
CERTIFICATE OF CORRECTION

Patent No. 3,453,068                Dated   July 1, 1969

Inventor(s) Richard G. Tave

It is certified that error appears in the above-identified patent and that said Letters Patent are hereby corrected as shown below:

Column 6, Claim 7, line 14 should read:

"the bottoms fraction of the reaction product of an organic"

instead of:

"the bottoms fraction of the reaction product or an organic"

SIGNED AND
SEALED
MAR 10 1970

(SEAL)
Attest:

Edward M. Fletcher, Jr.
Attesting Officer

WILLIAM E. SCHUYLER, JR.
Commissioner of Patents